(12) United States Patent  
Crabtree

(10) Patent No.: US 7,967,280 B2
(45) Date of Patent: Jun. 28, 2011

(54) AIR SPRING WITH DEBRIS AND ICE BARRIER

(75) Inventor: Michael L. Crabtree, Arvada, CO (US)

(73) Assignee: Vibracoustic North America, L.P., Plymouth, MI (US)

( * ) Notice: Subject to any disclaimer, the term of this patent is extended or adjusted under 35 U.S.C. 154(b) by 806 days.

(21) Appl. No.: 11/552,397

(22) Filed: Oct. 24, 2006

(65) Prior Publication Data

US 2008/0106013 A1    May 8, 2008

(51) Int. Cl.
*F16F 9/04* (2006.01)
(52) U.S. Cl. .................. 267/64.27; 267/64.23
(58) Field of Classification Search .... 267/64.21–64.24, 267/64.27
See application file for complete search history.

(56) References Cited

U.S. PATENT DOCUMENTS

| 3,596,895 | A  | * | 8/1971  | Hirtreiter ................... 267/64.24 |
| 4,934,667 | A  | * | 6/1990  | Pees et al. .................. 267/64.21 |
| 6,637,733 | B1 | * | 10/2003 | Weitzenhof et al. ....... 267/64.27 |
| 6,845,973 | B2 | * | 1/2005  | Ferrer ........................ 267/64.24 |
| 7,188,827 | B2 | * | 3/2007  | Thomae et al. ............ 267/64.21 |

\* cited by examiner

*Primary Examiner* — Christopher P Schwartz
(74) *Attorney, Agent, or Firm* — Ronald W. Wangerow, Esq.; Harness, Dickey & Pierce, P.L.C.

(57) ABSTRACT

An air spring including a spring seat, and a flexible sleeve connected to the spring seat. The flexible sleeve forms a compression chamber and includes a lobe that rolls along a surface of the spring seat during compression of the flexible sleeve. An annular barrier is disposed on the spring seat between the lobe of the flexible sleeve and the surface of the spring seat to deflect debris and ice from becoming lodged or trapped in the spring seat that may damage the flexible sleeve.

7 Claims, 3 Drawing Sheets

US 7,967,280 B2

AIR SPRING WITH DEBRIS AND ICE BARRIER

FIELD

The present disclosure relates to an air spring including an annular barrier for deflecting debris and ice.

BACKGROUND

The statements in this section merely provide background information related to the present disclosure and may not constitute prior art.

Air springs are commonly used for motor vehicles, various machines, and other equipment. The springs are designed to support a suspension load. The springs are often combined with a separate shock absorber device in the suspension that functions to dampen oscillations. Air springs generally consist of a flexible elastomeric reinforced sleeve that extends between a pair of end members. The sleeve is attached to the end members to form a pressurized chamber therein.

During operation of the air spring, the flexible sleeve will compress to adjust a volume of the pressurized chamber. To accommodate this flexing, the sleeve will form lobes as the sleeve is compressed that roll along surfaces of the end members. If any debris is present between the end members and lobes, however, the sleeve may become damaged, which will shorten its useful life, as well as reduce the efficiency of the air spring. To solve this problem, it is known to completely enclose the air spring with a protective shield. The use of this protective shield, however, is undesirable in that it adds undesirable weight to the air spring and, therefore, the vehicle. Further, the protective shield adds to the manufacturing costs of the air spring. Accordingly, there is a need for an improved air spring that prevents debris and ice from becoming lodged between the lobes of the elastomeric sleeve and end members.

SUMMARY

With the above need in mind, the present teachings provide an air spring including a spring seat, and a flexible sleeve connected to the spring seat. The flexible sleeve forms a compression chamber and includes a lobe that rolls along a surface of the spring seat during compression of the flexible sleeve. An annular barrier is disposed on the spring seat between the lobe of the flexible sleeve and the surface of the spring seat to deflect debris and ice from becoming lodged or trapped in the spring seat that may damage the flexible sleeve.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
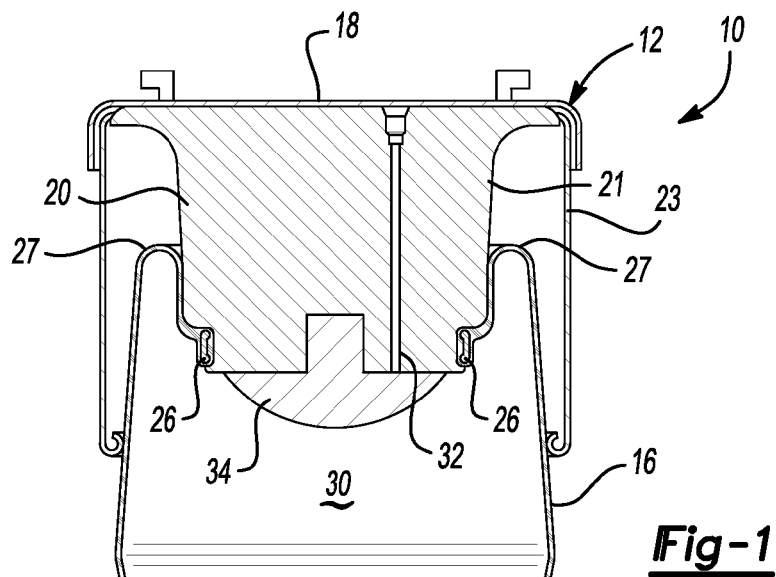
FIG. 1 is a cross-sectional view of an air spring according to the present teachings.

The following description is merely exemplary in nature and is not intended to limit the present disclosure, application, or uses. It should be understood that throughout the drawings, corresponding reference numerals indicate like or corresponding parts and features.

Figure 2:
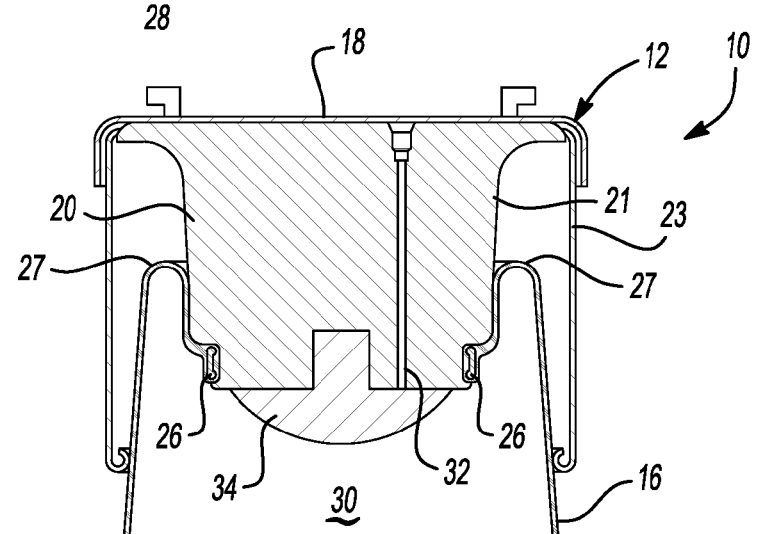
FIG. 2 is a cross-sectional view of an air spring according to the present teachings.
Figure 2:
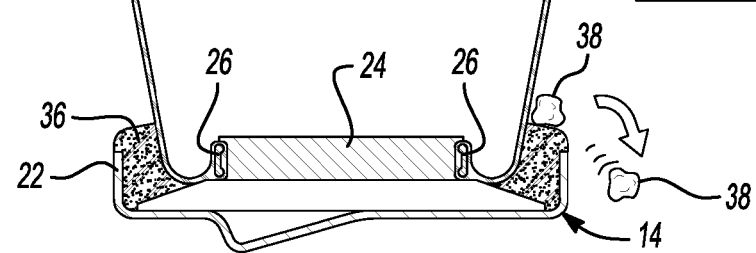
Figure 3:
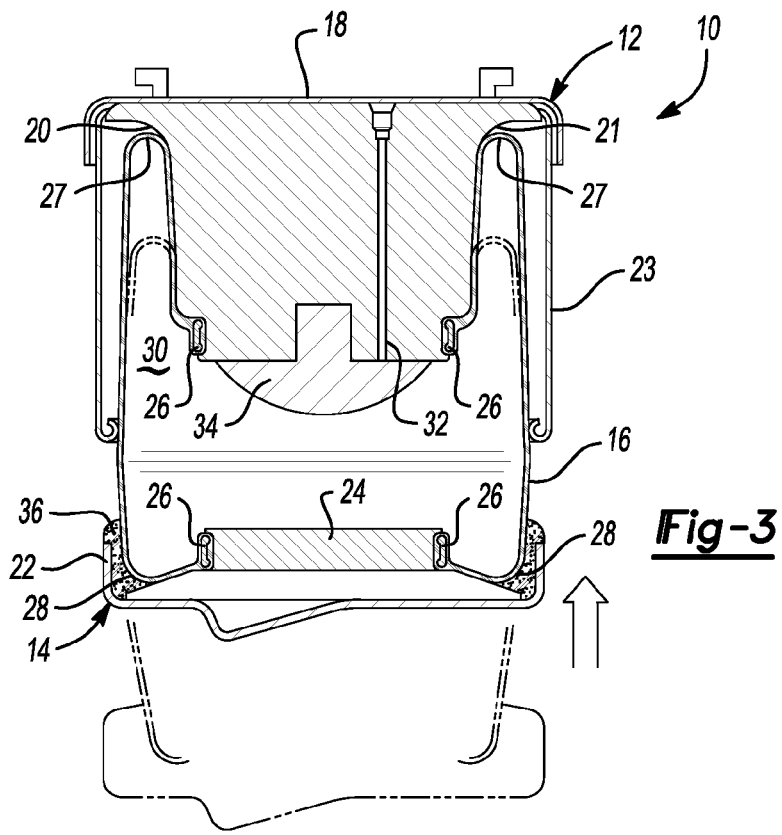
FIG. 3 is a cross-sectional view of the air spring of FIG. 2 in a compressed state.

Referring to FIGS. 1-3, the air spring device of the present teachings will now be described. As shown in the figures, the air spring device 10 generally includes an upper spring seat 12 and a lower spring seat 14. Connecting the upper seat 12 and a lower spring seat 14 is a flexible sleeve 16 that forms a compression chamber 30.

The upper spring seat 12 generally includes an upper cap member 18 that supports a piston 20. Also connected to the upper spring seat 12 and surrounding the piston 20 is a cylindrical shield 23 that protects the piston 20 from being damaged by debris. Lower spring seat 14 includes a protective collar 22 and a connection member 24. The sleeve 16 is connected to the piston 20 and the connection member 24 by clamping rings 26. The sleeve is generally elastomeric or composite in nature. If elastomeric, the sleeve 16 may have cords embedded in the elastomeric body. If composite, the sleeve may have a first flexible member connected in a partially overlapping manner to a second flexible member. Regardless, any type of sleeve known to one skilled in the art may be used with the present teachings, without limitation.

During operation of the air spring, the sleeve 16 will compress and lobes 27 and 28 of the sleeve 16 will roll along surfaces of the piston 20 and the lower spring seat 14, respectively. Specifically, the lobes 27 of the sleeve 16 connected to the piston 20 will roll along an outer surface 21 of the piston 20, and lobes 28 of the sleeve 16 attached to the connection member 24 will roll along and be supported by the protective collar 22. In this manner, air or fluid within chamber 30 will increase and decrease according to a volume of the chamber 30 that is contingent upon flexing of the sleeve 16. Air that is in the chamber 30 may enter and be disposed of through a conduit 32 which is an axially disposed bore that travels through the piston 20. At a portion of the conduit 32 that is adjacent the chamber 30 is disposed a plug 34. The plug 34 can open and shut during vibrations experienced by the air spring 10.

In accordance with the present teachings, and as best shown in FIGS. 1 and 2, the air spring 10 of the present teachings includes an annular barrier or seal 36 which is disposed in the lower spring seat 14. The annular seal 36 is preferably comprised of a flexible polymer or thermal plastic elastomer. In this manner, the annular ring 36 is compressible (FIG. 3). Materials that may be used to form the annular seal 36 include natural rubber, SBR, butadiene blends, nitrile, neoprene, polychloroprene, urethanes, EPDM, and combinations thereof. Preferably, these materials form closed-cell foams to prevent the annular seal 36 from absorbing any moisture that the air spring 10 is exposed to, but the present teachings are also adaptable to open-celled foams. If an open-celled foam is used, a coating of another material should be formed to cover the open cells of the foam to prevent or at least substantially minimize the absorption of water by the annular seal 36. Regardless what material is chosen for the annular seal 36, the material should be compressible to accommodate the rolling lobes 28 of the sleeve 16 when the air spring 10 is compressed.

To manufacture the annular seal 36, any method known to one skilled in the art may be used. In this regard, the annular seal 36 is preferably formed by injection molding or compaction molding. Other methods include using a water-jet to cut and form the annular seal 36, as well as extrusion molding. Regardless, any method proficient at producing the annular seal 36 may be used.

Figure 4:
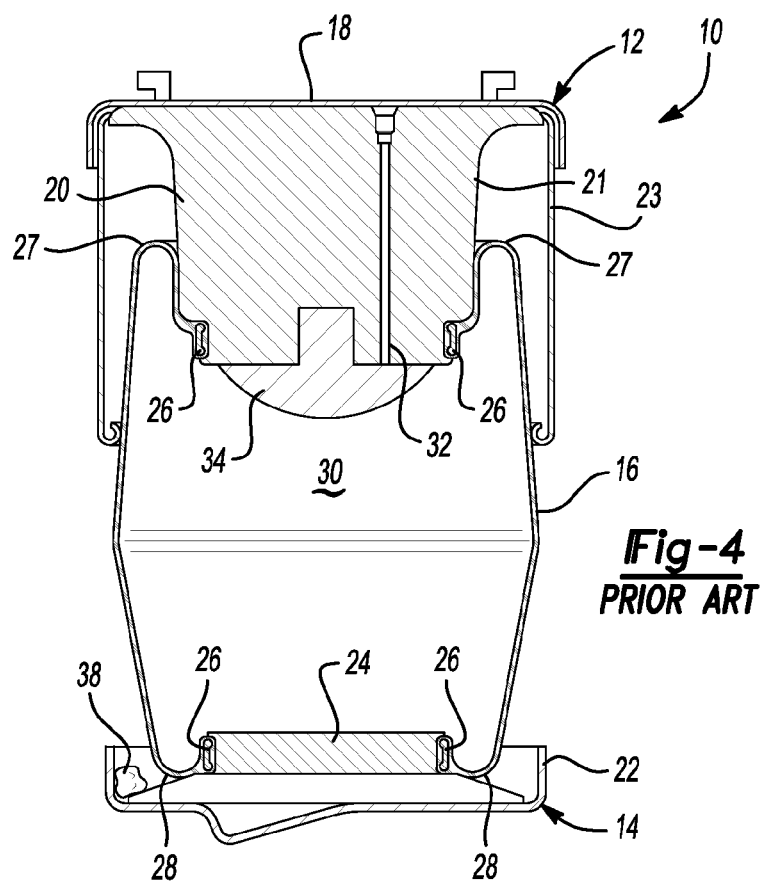
FIG. 4 is a cross-sectional view of a prior art air spring.
Figure 5:
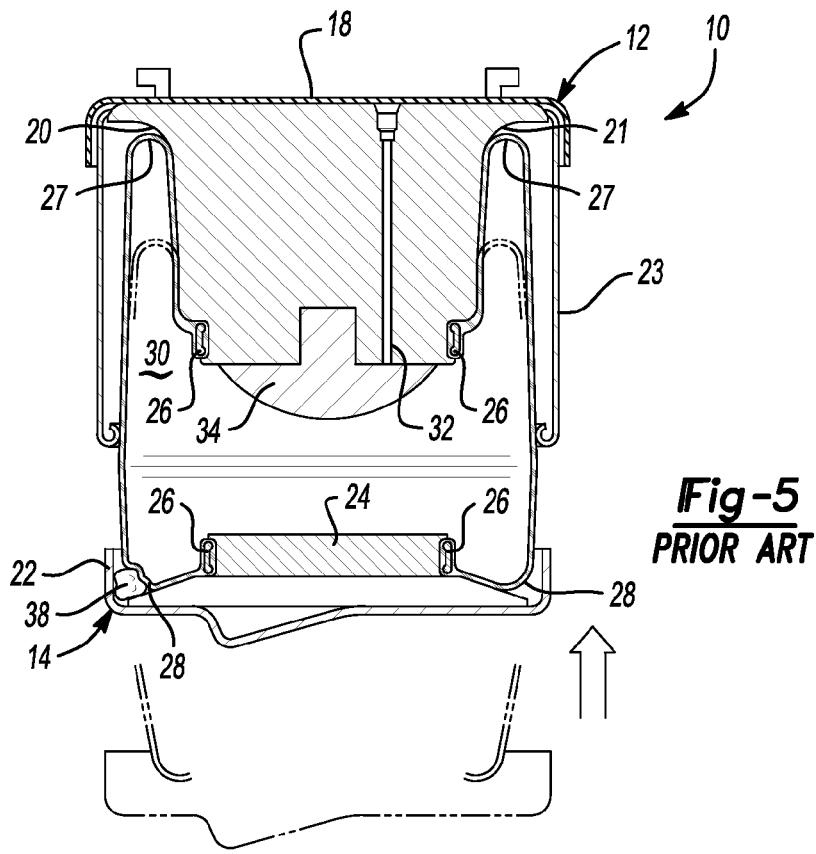
FIG. 5 is a cross-sectional view of the prior art air spring of FIG. 4 in a compressed state.

According to the present teachings, the material should be selected such that the annular seal 36 is proficient at preventing debris and ice that the air spring device 10 may be exposed to during operating conditions from becoming trapped in the lower spring seat 14. More specifically, referring to FIGS. 2, 4, and 5, the air spring 10 will be exposed to debris and ice during operation of the motor vehicle. Without the annular seal 36, the debris or ice 38 may become lodged or trapped by the protective collar 22 (FIG. 4). If the debris or ice 38 becomes trapped in the protective collar 22, it may damage or crimp the sleeve 16 when the sleeve 16 compresses and the lobes 28 roll along the surface of the collar 22. This is undesirable because the useful life of the sleeve 16 may be shortened, as well as the efficiency of the air spring 10 will be reduced if holes or tears develop in the sleeve 16.

Now referring to FIG. 2, it can be seen that by disposing the annular seal 36 in the lower spring seat 14 the debris 38 is prevented from becoming lodged or trapped within the lower spring seat 14 because the seal 36 acts as a barrier that prevents the debris or ice 38 from entering the protective collar 22. In other words, the debris 38 is deflected by the annular ring 36. Accordingly, damage to the sleeve 16 can be prevented or at least substantially minimized.

During compression of the air spring device 10, the annular ring 36, as stated above, is formed of a compressible material. In this regard, during compression of the spring 16, as shown in FIG. 3, it can be seen that the compressible material of the annular ring 36 will compress such that it does not inhibit a rolling motion of the lobe 28 through the protective collar 22 of the lower spring seat 14. In this manner, the air spring device 10 is allowed to operate as designed. Upon decompression of the air spring 10 and sleeve 16, the annular seal 36 will return to its original form. In this manner, the annular seal 36 continually fills the space between the lobe 28 of the sleeve 16 and the protective collar 22 to prevent, or at least substantially minimize, the intrusion of debris and ice in the protective collar 22. Furthermore, the spring or bellow 16 is prevented from becoming damaged by any debris which may become lodged in a lower spring seat 14. Accordingly, the useful life of the air spring device 10 and the sleeve 16 is increased.

Figure 6:
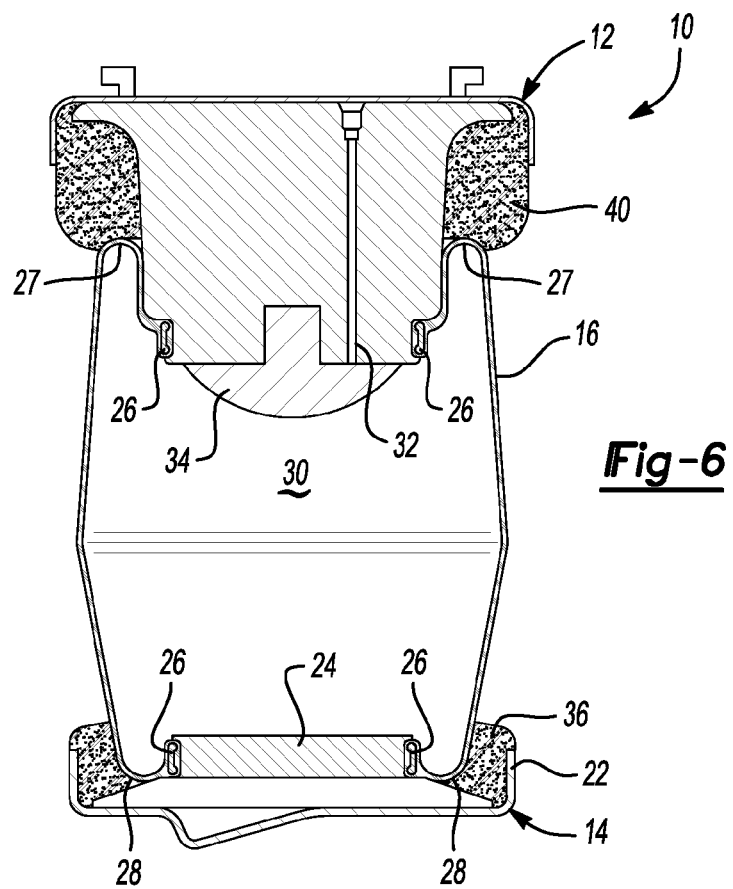
FIG. 6 is a cross-sectional view of an air spring according to the present teachings.

Although the above embodiments describe a configuration where the annular barrier 36 is disposed in the lower spring seat 14, it should be understood that the present teachings should not be limited thereto. That is, referring to FIG. 6, the air spring 10 of the present teachings may also include an annular barrier 40 disposed within the upper spring seat 12 as well. In this manner, the need for the protective shield 23 can be eliminated. Accordingly, debris may also be prevented, or least substantially minimized, from becoming lodged or trapped in the upper spring seat 12. What's more, the weight of the air spring 10 can be further reduced by removing the need for the protective shield 23.

The description of the present teachings is merely exemplary in nature and, thus, variations that do not depart from the gist of the present teachings are intended to be within the scope of the present teachings. Such variations are not to be regarded as a departure from the spirit and scope of the present teachings.

What is claimed is:

1. An air spring comprising:
   an upper spring seat, said upper spring seat supporting a piston;
   a lower spring seat including a protective collar;
   a flexible sleeve connecting said piston and said lower spring seat, said flexible sleeve forming a compression chamber and including lobes that roll along surfaces of said piston and said lower spring seat during compression of said flexible sleeve; and
   a compressible annular barrier disposed within said protective collar, said annular barrier adapted to compress when said lobe of said flexible sleeve rolls along said lower spring seat, and adapted to deflect debris from entering said protective collar.

2. The air spring of claim 1, wherein said annular barrier is formed of an open-celled foam.

3. The air spring of claim 2, wherein said annular barrier includes a coating.

4. The air spring of claim 1, wherein said annular barrier is formed of a material selected from the group consisting of natural rubber, SBR, butadiene blends, nitrile, neoprene, polychloroprene, urethanes, EPDM, and combinations thereof.

5. The air spring of claim 1, wherein said annular barrier is formed of a closed-cell foam.

6. The air spring of claim 1, wherein said annular barrier is resistant to water.

7. The air spring of claim 1, further comprising another annular barrier disposed within said upper spring seat, said another annular barrier adapted to compress when said lobe of said flexible sleeve rolls along said surface of said piston, and adapted to deflect debris from entering said upper spring seat.

* * * * *